(12) United States Patent
Schindler et al.

(10) Patent No.: US 9,131,191 B2
(45) Date of Patent: Sep. 8, 2015

(54) SYNCHRONIZING OPERATIONAL STATES OF CLOSED CAPTIONING AND AUDIO MUTE

(75) Inventors: John Schindler, Ladera Ranch, CA (US); William Pat Price, Rhome, TX (US)

(73) Assignee: Vizio Inc., Irvine, CA (US)

( * ) Notice: Subject to any disclaimer, the term of this patent is extended or adjusted under 35 U.S.C. 154(b) by 2043 days.

(21) Appl. No.: 12/233,120

(22) Filed: Sep. 18, 2008

(65) Prior Publication Data

US 2010/0066904 A1  Mar. 18, 2010

(51) Int. Cl.
| | |
|---|---|
| *H04N 7/00* | (2011.01) |
| *H04N 5/44* | (2011.01) |
| *H04N 21/475* | (2011.01) |
| *H04N 21/485* | (2011.01) |
| *H04N 21/488* | (2011.01) |
| *H04N 5/60* | (2006.01) |
| *H04N 5/445* | (2011.01) |
| *H04N 21/43* | (2011.01) |
| *H04N 21/439* | (2011.01) |
| *H04N 21/45* | (2011.01) |
| *H04N 21/466* | (2011.01) |

(52) U.S. Cl.
CPC ........... *H04N 5/602* (2013.01); *H04N 5/44513* (2013.01); *H04N 21/4307* (2013.01); *H04N 21/4396* (2013.01); *H04N 21/4532* (2013.01); *H04N 21/4667* (2013.01); *H04N 21/4755* (2013.01); *H04N 21/4852* (2013.01); *H04N 21/4884* (2013.01)

(58) Field of Classification Search
CPC .............. H04N 5/44513; H04N 5/602; H04N 21/4307; H04N 21/4396; H04N 21/4884; H04N 21/4667; H04N 21/4755; H04N 21/4852; H04N 21/4532
See application file for complete search history.

(56) References Cited

U.S. PATENT DOCUMENTS

| | | | |
|---|---|---|---|
| 5,327,176 A | 7/1994 | Forler et al. | |
| 5,408,273 A | 4/1995 | Okamura | |
| 6,198,511 B1 * | 3/2001 | Matz et al. | 348/553 |
| 7,508,450 B1 * | 3/2009 | Abernethy et al. | 348/465 |
| 2002/0186320 A1 * | 12/2002 | Carlsgaard et al. | 348/468 |
| 2005/0038661 A1 * | 2/2005 | Momosaki et al. | 704/275 |
| 2005/0223013 A1 * | 10/2005 | Jarman | 707/10 |
| 2010/0031162 A1 * | 2/2010 | Wiser et al. | 715/747 |

* cited by examiner

*Primary Examiner* — Brian Yenke
*Assistant Examiner* — Sean Haiem
(74) *Attorney, Agent, or Firm* — Law Office of Scott C. Harris, Inc.

(57) ABSTRACT

The current invention addresses the problem of causing closed captioning to be launched or not launched automatically when a viewer mutes the audio on a digital television. The current invention allows for individualized options associated with a particular viewer. These options can be selected from a plurality of options either manually or automatically as determined by the viewer settings or viewer behavior.

17 Claims, 6 Drawing Sheets

SYNCHRONIZING OPERATIONAL STATES OF CLOSED CAPTIONING AND AUDIO MUTE

FIELD OF THE INVENTION

The present invention relates to digital television and closed captioning and audio mute control systems.

BACKGROUND OF THE INVENTION

Beginning in July 1993, the Federal Communications Commission (FCC) required all analog television receivers with screens 13 inches or larger sold or manufactured in the United States to contain built-in decoder circuitry to display closed captioning. Beginning Jul. 1, 2002, the FCC also required that digital television (DTV) receivers include closed captioning display capability.

Digital televisions have greater control over the processing of closed caption displays than did analog televisions. Viewers however are limited in how they can use the closed captioning feature. Typically closed captioning is generally always off, always on, or invoked once the audio is muted. This methodology treats the possible relationships between closed captioning and audio mute in a global fashion locking all of the viewers into one of three modes regardless of whom in a family is watching the television. This lock step method of managing the closed caption feature on the television may, or more often, does not fill the needs or desires of a group of viewers.

Prior Art

There are 2 examples of prior art relating to closed captioning systems that can be automatically invoked when the viewer of a television selects audio mute to be active. U.S. Pat. No. 5,327,176 to Forlet Jul. 5, 1994 teaches a methodology where the closed captioning system of a television has a number of finite states such as always on, always off, or toggles in sync with mute on and off. 176 teaches that if the viewer sends a mute command to the television and the closed captioning system is not in a closed captioning with audio state, the transition to mute will also include launching closed captioning. 176 further teaches that if the viewer sends a mute off command to the television and the closed captioning system is not in a closed captioning with audio state, the transition to audio on will also include disabling or turning off of closed captioning. 176 further teaches that if the viewer sends a mute off command to the television and the closed captioning system is in a closed captioning with audio state, the transition to audio on will not disable or turn off the closed captioning.

U.S. Pat. No. 5,408,273 Okamura Apr. 18, 1995 teaches a different technique. 273 teaches that there may be several modes of operation related to closed captioning among which are captioning always on (which is described in 176 as captioning with audio) and always off. 273 further teaches that when mute is off and a mute key input is received the television will mute the audio output and the mute control circuitry will send a signal to the caption control circuitry resulting in captioning being turned on. 273 also teaches that if the caption state is such that it is always on, the caption state will not be turned off if mute is transitioned from on to off.

176 and 273 treats synchronizing of closed captioning and muting modes globally.

SUMMARY OF THE INVENTION

It is the intent of the current invention to offer a rich set of options to the viewer for controlling the synchronization of possible closed captioning modes and audio mute modes.

Embodiments describe an expanded number of modes of operation and interaction between the functions and allows these operational modes and interactions to be customized for each possible viewer/user of the television.

According to an embodiment, when the viewer mutes the television, a dialog display is presented to the viewer asking the viewer if they want to invoke closed captioning. If the viewer responds in the affirmative, closed captioning is turned on.

An embodiment may use closed captioning modes of operation may also drive the operational state of the audio mute functional modes.

BRIEF DESCRIPTION OF THE DRAWINGS

Embodiments of the present invention are illustrated by way of example, and not by way of limitation. The following figures and the descriptions both brief and the detailed descriptions of the invention refer to similar elements and in which.

DETAILED DESCRIPTION

Figure 1:
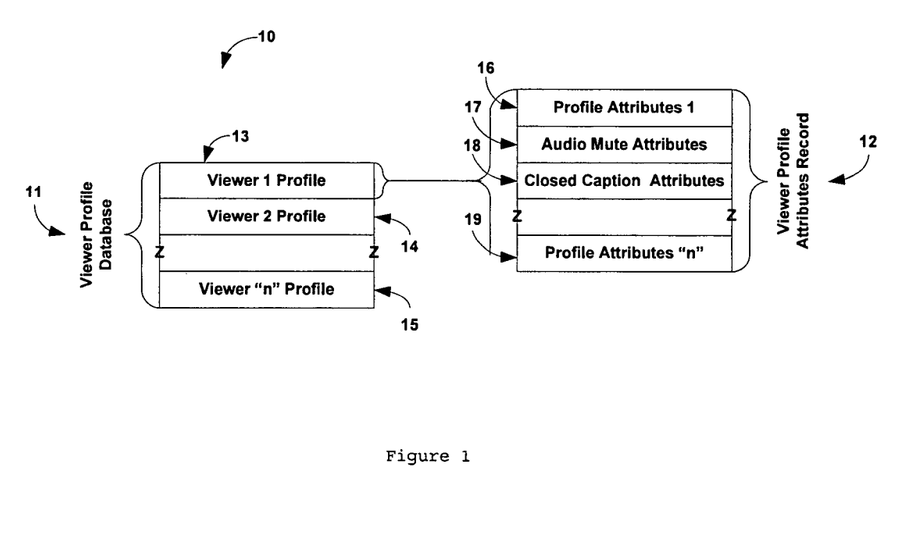
FIG. 1 depicts a viewer's profile database containing sets of attributes unique to each viewer that has a profile on the digital television.

FIG. 1 shows an arrangement where 10 is a depiction of the viewer profile database 11 and the viewer profile attributes 12. The viewer profile database 11 is made up of a series of records for viewer profile 1 13, viewer profile 2 14, and viewer profile 'n' 15.

Viewer profile attributes record 12 has a series of operational attributes including profile attributes 1 16, audio mute attributes 17, closed caption attributes 18, and profile attributes 'n' 19. Each viewer of the television may have a unique profile attributes record identifying that viewer's preferences in the form of attributes accessible to the software applications that make up the suite of applications that manage and control the television.

Audio mute attributes 17 and closed caption attributes 18 may have a plurality of different values. For example, each behavior associated with the closed caption attributes 18 may include but not be limited to: launch closed captions on mute; prompt for closed caption on mute; never launch closed caption; automatically translate closed captions in English to Spanish or other of a plurality of predetermined languages; launch closed captions when viewer logs on; and/or others.

Some of the attributes in a given set of attributes such as closed caption attributes 18 may be set to "on" with other attributes contained in closed caption attributes 18 and some attributes are set such that they are mutually exclusive. For example, "launch closed captions on mute" and "never launch closed captions" are mutually exclusive and are labeled such that they cannot be simultaneously set. However, options such as "launch closed captions on mute" and "automatically translate closed captions in English to Spanish" may both be set to "on" at the same time.

Figure 2:
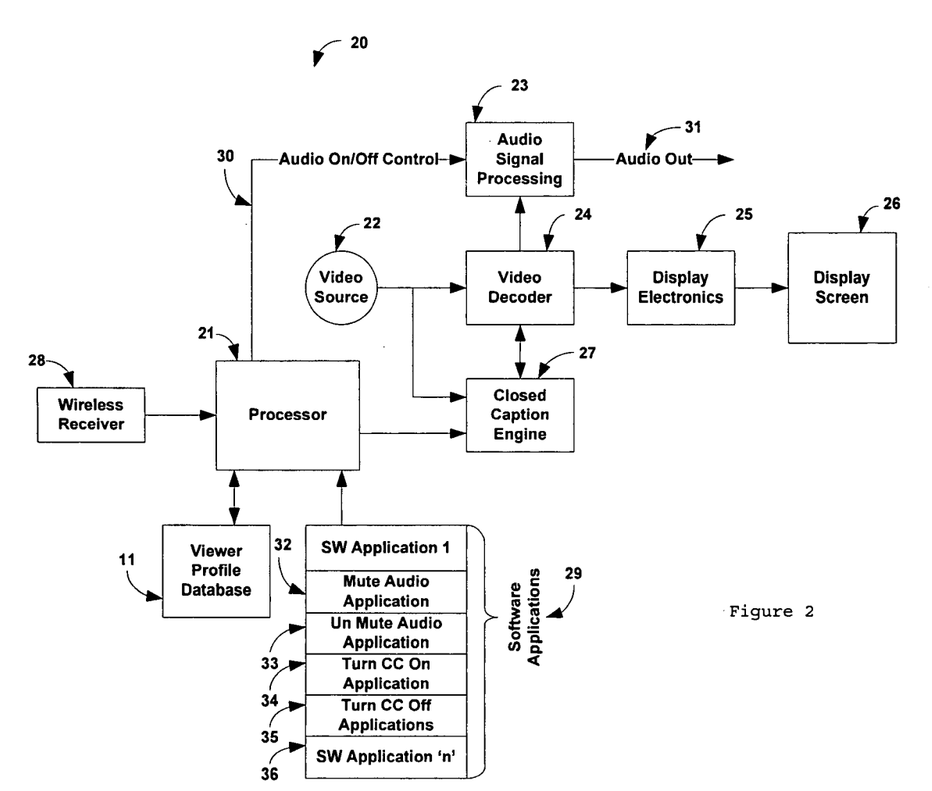
FIG. 2 is a basic depiction of a digital television capable of hosting the current invention.

FIG. 2 shows an alternative, where 20 is a block diagram depiction of a digital television system capable of operating according to the embodiments. The control mechanism for the digital television is processor 21. Processor 21 may be a typical System On Chip technology well known in the digital television business and may contain multiple processors in the single chip package or may only contain a single processor and may include custom circuitry, e.g., ASIC or FPGAS. System 20 receives control signals from the viewer through wireless receiver 28. Wireless receiver 28 may be either an infrared receiver or a radio frequency receiver or any other control device capable of receiving control signals from a hand held remote control device capable of sending control signals to a digital television. Wireless receiver 28 converts the wireless control signals to electrical control signals and sends the electrical control signals to processor 21.

Processor 21 decodes the electrical control signals. When processor 21 recognizes an audio mute command, it launches the mute audio application 32 which is one of a plurality of software applications 29. Audio mute application 32 manages the mute process by first sending audio on/off control 30 to audio signal processing 23. Audio on/off control will be set to audio off. Audio signal processing 23 will turn off audio out 31 effectively muting any audio to any internal or external audio systems.

Mute audio application 32 then accesses viewer profile database 11 to determine if any of the viewers with a profile are logged onto the television. The "logged on" as described in this specification means that some identifying indicia of the user watching the tv is detected, e.g., the user selects an icon or avatar indicative of the user, or different users use different remotes or other.

If no viewers are currently logged on to the television, mute audio application 32 will cause a prompt to be displayed on the television asking the viewer if they want to activate the closed captioning system. If the viewer does not respond within a preset time or responds with a "do not launch" response, the prompt will be removed and closed captioning will not be launched. If the viewer responds with a "do launch" response, mute audio application 32 will turn on closed caption engine 27 which will process the video stream received from video source 22 and extract the closed caption data, format the data, and send the formatted data to video decoder 24. Video decoder 24 places the received closed caption data received from closed caption engine 27 over the video that video decoder 24 received from video source 22. Video decoder 24 then sends the composite video and closed caption data to display electronics 25. Display electronics 25 processes the decode video into signals that are sent to display screen 26.

When wireless receiver 28 receives an un mute control signal from the viewer, it convert the wireless control signals to electrical control signals and sends the electrical control signals to processor 21. Processor 21 decodes the electrical control signals and when it recognizes an audio un mute command will launch un mute audio application 33 which is one of a plurality of software applications 29. Un mute audio application 33 will manage the un mute process by first sending audio on/off control 30 to audio signal processing 23. Audio on/off control will be set to audio on. Audio signal processing 23 will turn on audio out 31 effectively sending audio to any internal or external audio systems.

Un mute audio application 33 then checks to see if closed captioning is on. If closed captioning is on, un mute application 33 then accesses viewer profile database 11 to determine if any of the viewers with a profile are logged onto the television. If no viewers are currently logged on and closed captioning is current active, un mute audio application 33 cause a prompt to be displayed on the television asking the viewer if they want to deactivate the closed captioning system.

If the viewer does not respond within a preset time or responds with a "do not deactivate" response, the prompt will be removed and closed captioning will not be deactivated. If the viewer responds with a "deactivate closed captioning", mute audio application 33 will turn off closed caption engine 27 which will stop processing the video stream sent by video source 22 to extract the closed caption data. Once video decoder 24 stops receiving closed caption data, it will stop compositing that data with video received from video source 22.

If the viewer was logged on to the television and closed captioning was active un mute audio application 33 will access the viewer's viewer profile attributes record 12 from the viewer profile database 11. If the viewer's closed caption attributes indicates that closed captioning is to be turned off when the audio is active, then un mute audio application 33 will turn off closed caption engine 27 which will stop processing the video stream sent by video source 22 to extract the closed caption data. Once video decoder 24 stops receiving closed caption data it will stop composting that data with video received from video source 22.

Figure 3:
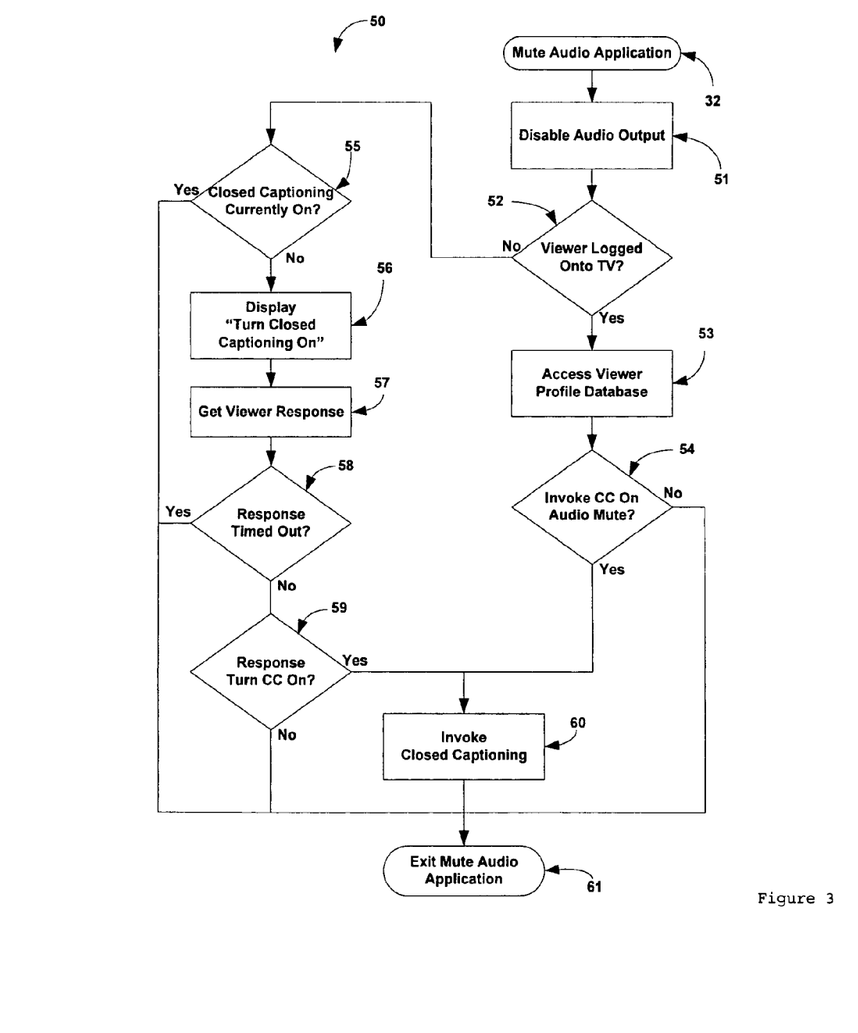
FIG. 3 is a flowchart depicting the basic control flow for the audio mute application.

FIG. 3 shows flow chart 50 which depicts the processing work flow executed by mute audio application 32. When mute audio application 32 is started executing on processor 21, it executes processing block disable audio output 51. This processing step effectively turns off audio output from the digital television system 20. Audio out 31 may be tied to internal and/or external audio systems. Processing decision block viewer logged onto TV 52, checks to see if any viewer is currently logged onto digital television 20. If a viewer is logged onto digital television 20, processing control will fall through to access viewer profile database 53. Access viewer profile database 53 accesses the viewer's viewer profile attributes record 12 from viewer profile database 11. Processing decision block, invoke CC on audio mute 54, checks a specific attribute contained in viewer profile attributes record 12 to see if closed captioning is to be activated when audio is muted. If closed captioning is to be activated when audio is muted for this viewer then control falls through to invoke closed captioning 60, else control falls through to exit mute audio application 61. Invoke closed captioning 60 turns on the closed captioning engine 27 which parses any closed captioning data out of the video stream provided by video source 22.

If processing decision block, viewer logged onto TV 52, detects that a viewer is not currently logged onto digital television 20, the processing will pass control to processing decision block closed captioning currently on 55. If closed captioning is currently active processing decision block closed captioning currently on 55 will pass control to exit mute audio application 61. If closed captioning is not currently active processing decision block closed captioning currently on 55 will pass control to processing block display "Turn Closed Captioning On" 56 which will present a dialog on the television screen asking the viewer if he wants to active closed captioning. Control will then fall through to get viewer response 57 where the application will wait for some predetermined period of time for the viewer to respond to the dialog prompt, e.g., 30 seconds or one minute. Processing decision block, response timed out 58, determines if the viewer did or did not respond within a specified period of time. If the viewer did not respond and the time period timed out, control will be passed to exit mute audio application 61, else if the viewer did respond within the time period control will be passed to processing decision block response turn CC on 59.

Processing decision block response turn CC on 59, determines if the viewer responded with a turn closed captioning on, or a, do not turn closed captioning on. If the viewer responded with a turn closed captioning on, control will be passed to invoke closed captioning 60, else control will be passed to exit mute audio application 61.

Figure 4:
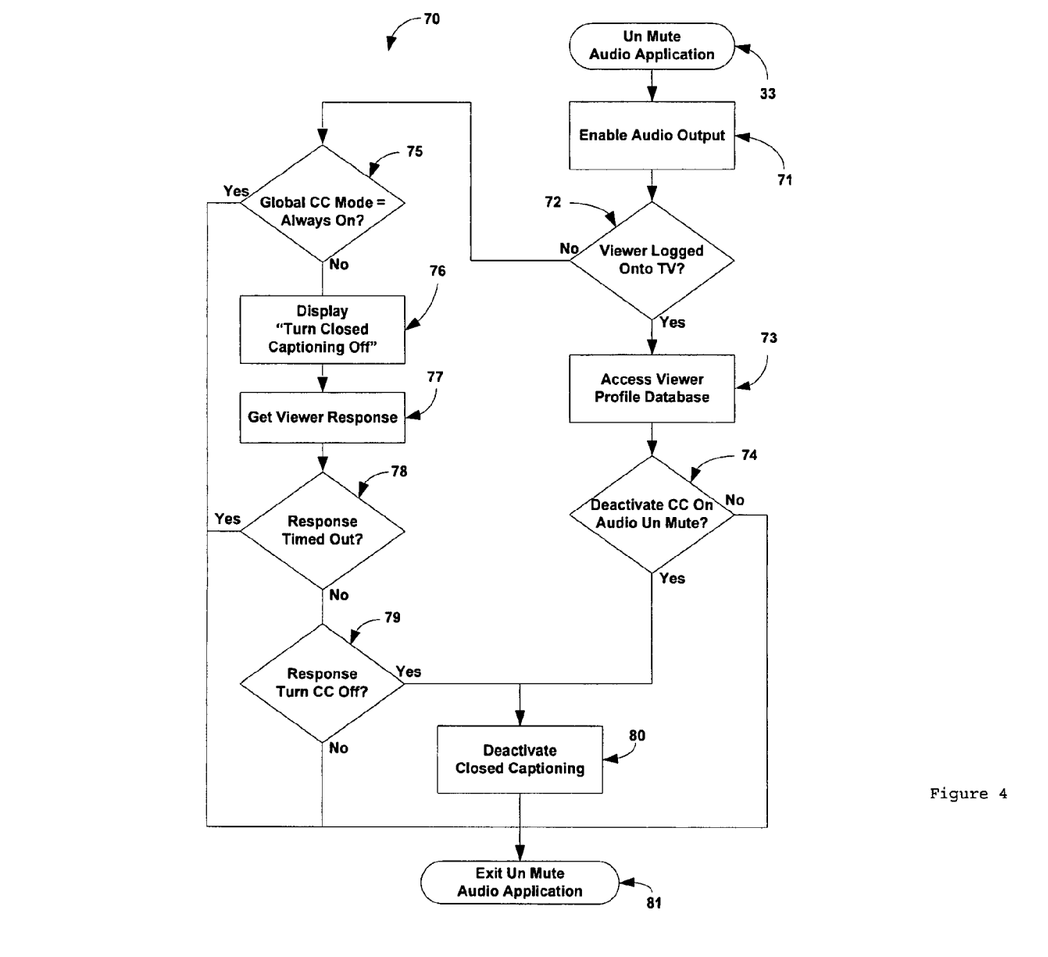
FIG. 4 is a flowchart depicting the basic control flow for the deactivating audio mute application.

Flow chart 70 in FIG. 4 depicts the processing work flow executed by un mute audio application 33. When un mute audio application 33 is started executing on processor 21, it will execute processing block enable audio output 71. This processing step effectively turns on audio output from digital television system 20. Audio out 31 may be tied to internal and/or external audio systems. Processing decision block viewer logged onto TV 72, checks to see if any viewer is currently logged onto digital television 20. If a viewer is logged onto digital television 20, processing control will fall through to access viewer profile database 73. Access viewer profile database 73 accesses the viewer's viewer profile attributes record 12 from viewer profile database 11. Processing decision block, deactivate CC on audio mute 74, checks a specific attribute contained in viewer profile attributes record 12 to see if closed captioning is to be deactivated when audio is un muted. If closed captioning is to be deactivated when audio is un muted for this viewer then control falls through to deactivate closed captioning 80, else control falls through to exit un mute audio application 81. Deactivate closed captioning 80 turns off the closed captioning engine 27 which stops parsing any closed captioning data out of the video stream provided by video source 22.

If processing decision block, viewer logged onto TV 72, detects that a viewer is not currently logged onto digital television 20, it will pass control to processing decision block global closed captioning=always on 75. If the global closed captioning attribute is equal to always on, processing decision block CC mode=always on 75 will pass control to exit un mute audio application 81. If closed captioning global attribute is not equal to always on, processing decision block CC mode=always on 75 will pass control to processing block display "Turn Closed Captioning Off" 76 which will present a dialog prompt on the television screen asking the viewer if he wants to turn closed captioning off. Control will then fall through to get viewer response 77 where the application will wait for some predetermined period of time for the viewer to respond to the dialog prompt. Processing decision block, response timed out 78 determines if the viewer did or did not respond within a specified period of time. If the viewer did not respond and the time period timed out, control will be passed to exit un mute audio application 81, else if the viewer did respond within the time period control will be passed to processing decision block response turn CC off 79.

Processing decision block response turn CC off 79, determines if the viewer responded with a "turn closed captioning on", or a "do not turn closed captioning on". If the viewer responded with a turn closed captioning on, control will be passed to deactivate closed captioning 80, else control will be passed to exit mute audio application 81.

Figure 5:
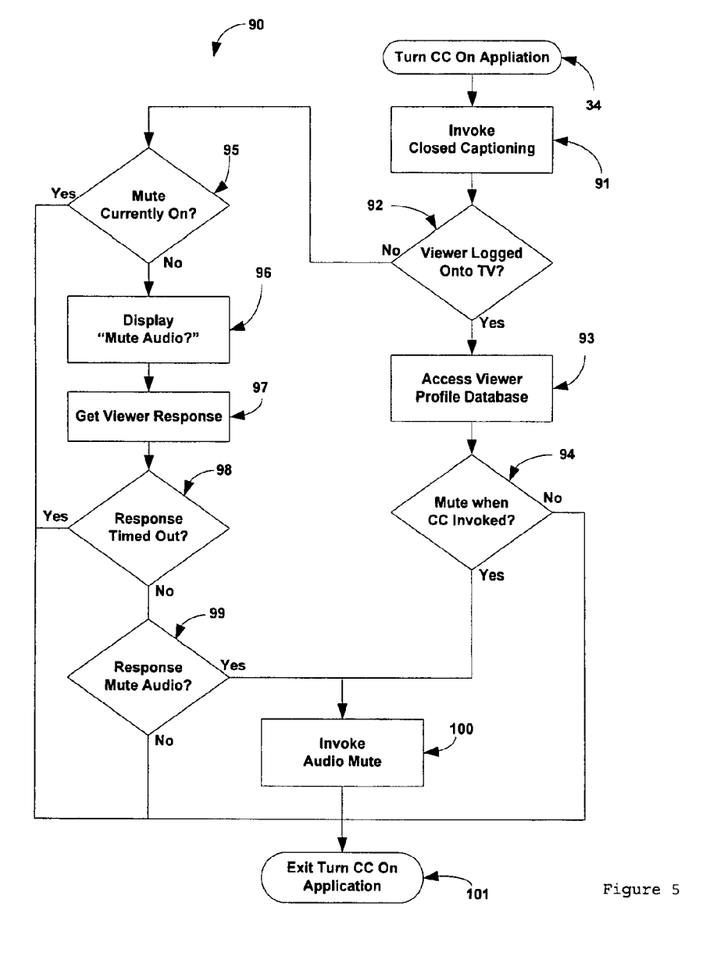
FIG. 5 is a flowchart depicting the basic control flow for the activating closed captioning application.

Now referencing FIG. 5 where flow chart 90 depicts the processing work flow executed by turn CC on application 34. When turn CC on application 34 is started executing on processor 21, it will execute processing block invoke closed captioning 91. This processing step turns on closed captioning engine 27 which parses any closed captioning data out of the video stream provided by video source 22.

Processing decision block viewer logged onto TV 92, checks to see if any viewer is currently logged onto digital television 20. If a viewer is logged onto digital television 20, processing control will fall through to access viewer profile database 93. Access viewer profile database 93 accesses the viewer's viewer profile attributes record 12 from viewer profile database 11.

Processing decision block, "mute when CC invoked" 94, checks a specific attribute contained in viewer profile attributes record 12 to see if audio is to be muted when closed captioning is active. If audio is to be muted when closed captioning is active for this viewer then control falls through to invoke audio mute 100, else control falls through to exit turn CC on application 101. Invoke audio mute 100 turns off audio output from the digital television system 20. Audio out 31 may be tied to internal and/or external audio systems.

If processing decision block, viewer logged onto TV 92, detects that a viewer is not currently logged onto digital television 20, it will pass control to processing decision block mute currently on 95. If mute is currently on processing decision block mute currently on 95 will pass control to exit turn CC on application 101.

If mute is not currently on, processing decision block mute currently on 95 will pass control to processing block display "Mute Audio?" 96 which will present a dialog prompt on the television screen asking the viewer if he wants to mute the audio. Control will then fall through to get viewer response 97 where the application will wait for some predetermined period of time for the viewer to respond to the dialog prompt.

Processing decision block, response timed out 98, determines if the viewer did or did not respond within a specified period of time. If the viewer did not respond and the time period timed out, control will be passed to exit turn CC on application 101, else if the viewer did respond within the time period control will be passed to processing decision block response mute audio 99.

Processing decision block response mute audio 99, determines if the viewer responded with a mute audio, or a, do not mute audio. If the viewer responded with a mute audio, control will be passed to invoke audio mute 100, else control will be passed to exit turn CC on application 101.

Figure 6:
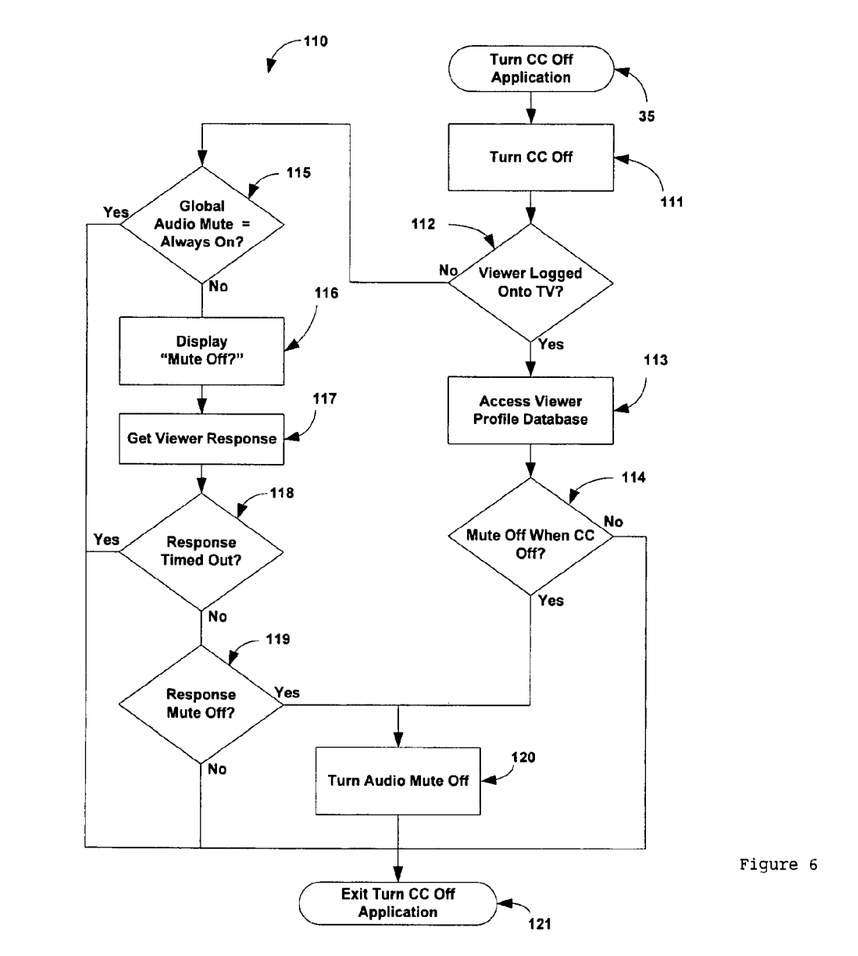
FIG. 6 is a flowchart depicting the basic control flow for the deactivating closed captioning application.

Now referencing FIG. 6 where flow chart 110 depicts the processing work flow executed by turn CC off application 35. When turn CC off application 35 is started executing on processor 21, it will execute processing block turn CC off 111. This processing step turns off closed captioning engine 27 which stops parsing any closed captioning data out of the video stream provided by video source 22.

Processing decision block viewer logged onto TV 112, checks to see if any viewer is currently logged onto digital television 20. If a viewer is logged onto digital television 20, processing control will fall through to access viewer profile database 113. Access viewer profile database 113 accesses the viewer's viewer profile attributes record 12 from viewer profile database 11.

Processing decision block, mute off when CC off 114, checks a specific attribute contained in viewer profile attributes record 12 to see if closed captioning is to be deactivated when audio is un muted. If audio mute is to be deactivated when closed captioning is turned off for this viewer then control falls through to turn audio mute off 120, else control falls through to exit turn CC off application 121. Turn audio mute off 120 turns on audio output from digital television system 20. Audio out 31 may be tied to internal and/or external audio systems.

If processing decision block, viewer logged onto TV 112, detects that a viewer is not currently logged onto digital television 20, it will pass control to processing decision block global audio mute=always on 115. If the global audio mute attribute is equal to always on, processing decision block global audio mute=always on 115 will pass control to exit turn CC off application 121. If global attribute audio mute is not equal to always on, processing decision block global audio mute=always on 115 will pass control to processing block display "Mute Off" 116 which will present a dialog prompt on the television screen asking the viewer if he wants to turn closed captioning off.

Control will then fall through to get viewer response 117 where the application will wait for some predetermined period of time for the viewer to respond to the dialog prompt. Processing decision block, response timed out 118 determines if the viewer did or did not respond within a specified period of time. If the viewer did not respond and the time period timed out, control will be passed to exit turn CC off application 121, else if the viewer did respond within the time period control will be passed to processing decision block response mute off 119.

Processing decision block response mute off 119, determines if the viewer responded with a "mute off", or a, "do not turn mute off". If the viewer responded with a mute off, control will be passed to turn audio mute off 120, else control will be passed to exit turn CC off application 121.

The audio attributes can also be used for different purposes. In another embodiment, the attribute pertaining to said audio subsystem may define a time of day when the audio volume of said digital television is set to a predetermined level. This can be used, for example, to turn down the volume at times when people are sleeping. The time of day can also be used to set times when the audio subsystem is automatically disabled and said closed captioning subsystem is automatically enabled; or conversely said audio subsystem is automatically enabled and said closed captioning subsystem is automatically disabled. It can be a time of day when the audio subsystem is automatically enabled if said audio subsystem was disabled; or when the closed captioning system is automatically disabled if said closed captioning subsystem was enabled. The closed captioning can also be turned on and/or off at a specified time of day.

Another embodiment can use timers. A first timer is started when the user manually disables said audio subsystem. The first timer is stopped when the user manually enables said closed captioning subsystem after disabling said audio system. This timer can be a counter, for example. When the value of the first counter is within a first predetermined range of values, an attribute for the user is set. That attribute causes the closed captioning subsystem to be automatically enabled when the audio subsystem is manually disabled by the user.

The processor can operate to start a first timer when the user manually disables the audio subsystem and to the first timer when the user manually disables the closed captioning subsystem after the closed captioning subsystem had automatically been enabled. The processor can detect if the value of the first timer is within a first predetermined range of values. It can set an additional attribute for the user contained in the database, where that additional attribute causes a dialog prompt will be displayed on the display asking the user if the user wants the closed captioning subsystem to be enabled if the user had disabled the audio subsystem.

The opposite can also occur—a first timer can be started when the user manually enables the audio subsystem; and said first timer stopped when the user manually enables the closed captioning subsystem after the closed captioning subsystem had automatically been disabled after the user has manually enabled the audio subsystem. Again, the processor detects if the value of the first timer is within a first predetermined range of values, and sets an additional attribute for the user contained in the database, the additional attribute causing a dialog prompt will be displayed on the display asking the user if the user wants the closed captioning subsystem to be disabled if the user had enabled the audio subsystem.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other ways of detecting when events involving the audio subsystem and the closed captioning subsystem occur can be used.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The computer may be a Pentium class computer, running Windows XP or Linux, or may be a Macintosh computer. The computer may also be a handheld computer, such as a PDA, cellphone, or laptop.

The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

The invention claimed is:

1. A digital television system comprising:
a display;
a television receiver operatively coupled to the display, operable to:
display television content on the display; and display text overlaid on said television content;
an audio subsystem that produces content associated with said television content;
a closed captioning subsystem that produces said text;
a processor operatively coupled to the display and to the television receiver;
a non volatile storage medium communicably coupled to the processor, said storage medium including a database comprising multiple profiles, each profile comprising a set of data associated with at least one user of said digital television system, said database including at least one attribute pertaining to said user of said digital television system;
each said profile including at least one attribute associated with said user pertaining to a behavior of said audio subsystem of said digital television system associated with at least one user, where said multiple profiles include a first profile for a first user which has a first behavior for said audio subsystem for said first user, and where said multiple profiles also include a second profile for a second user where said second profile represents a second behavior for said audio subsystem for said second user, said second behavior being different than said first behavior; and said at least one attribute associated pertaining to a behavior of said closed captioning subsystem of said digital television system associated with said audio subsystem that causes said audio subsystem to react different for said first profile that it does for said second profile.

2. The system of claim 1 where said display is integrated into said digital television.

3. The system of claim 1 where said display is external to said digital television and connected to said digital television through the use of a cable.

4. The digital television system comprising:
a display;
a television receiver operatively coupled to the display, operable to:
  display television content on the display; display text overlaid on said television content;
an audio subsystem;
a closed captioning subsystem;
a processor operatively coupled to the display and to the television receiver;
a non volatile storage medium communicably coupled to the processor, said storage including a database comprising a set of data associated with at least one user of said digital television system, said database including at least one attribute pertaining to said user of said digital television system;
at least one attribute associated with said user pertaining to a behavior of said audio subsystem of said digital television system associated with at least one user;
at least one attribute associated with said user pertaining to the behavior of said closed captioning subsystem of said digital television system associated with at least one user,
where said attribute pertaining to said audio subsystem contains a time of day when the audio volume of said digital television is set to a predetermined level.

5. The system of claim 1 where said attribute pertaining to said audio subsystem contains a first time of day when:
said audio subsystem is automatically disabled and said closed captioning subsystem is automatically enabled; and contains a second time of day when
said audio subsystem is automatically enabled and said closed captioning subsystem is automatically disabled.

6. The system of claim 1 where said attribute pertaining to said audio subsystem contains a time of day when:
said audio subsystem is automatically enabled if said audio subsystem was disabled; and
said closed captioning system is automatically disabled if said closed captioning subsystem was enabled, and wherein said audio subsystem is not automatically enabled if said audio subsystem was disabled, and said closed captioning method is not automatically disabled if said closed captioning subsystem was enabled other than during said time of day.

7. The system of claim 1 where said attribute pertaining to said closed captioning subsystem causes a software application to be launched and executed on said processor said application:
causes a dialog prompt to be presented on said display when user manually disables said audio subsystem and said closed captioning subsystem is currently disabled, said dialog prompt asking said user if said user wants the closed captioning subsystem enabled;
waits for a predefined time period for a response, where said user can respond such that one of:
said closed captioning subsystem is enabled;
said closed captioning subsystem is not enabled; or
said time period to wait for said response times out and said closed captioning subsystem is not enabled.

8. The system of claim 1 where said attribute pertaining to said closed captioning subsystem causes a software application to be launched and executed on said processor said application:
causing a dialog prompt to be presented on said display when user manually enables said audio subsystem and said closed captioning subsystem is currently enabled, said dialog prompt asking said user if said user wants the closed captioning subsystem disabled;
waits for a predefined time period, said user to respond such that one of:
said closed captioning subsystem is to be disabled;
said closed captioning subsystem is not to be disabled; or
said time period to wait for said response times out and said closed captioning subsystem is not disabled.

9. The system of claim 1 where said attribute pertaining to said closed captioning subsystem defines a time of day when:
said closed captioning subsystem is automatically enabled; and
when said closed captioning subsystem is automatically disabled.

10. The system of claim 1 further comprising a control that allows a user to manually disable said audio subsystem.

11. The system of claim 10, wherein said processor operates to start a first timer when said user manually disables said audio subsystem; and
stops said first timer when said user manually enables said closed captioning subsystem after disabling said audio system; and
wherein said processor detects if the value of said first timer is within a first predetermined range of values, and sets an additional attribute for said user contained in said database, said additional attribute causing said closed captioning subsystem to automatically be enabled when said audio subsystem is manually disabled by said user.

12. The system of claim 10, wherein said processor operates to start a first timer when said user manually enables said audio subsystem; and
stops said first timer when said user manually disables said closed captioning subsystem after disabling said audio system; and
wherein said processor detects if the value of said first timer is within a first predetermined range of values, and sets an additional attribute for said user contained in said database, said additional attribute causing said closed captioning subsystem to automatically be disabled when said audio subsystem is manually enabled by said user.

13. The system of claim 10, wherein said processor operates to start a first timer when said user manually disables said audio subsystem; and
stops said first timer when said user manually disables said closed captioning subsystem after said closed captioning subsystem had automatically been enabled; and
wherein said processor detects if the value of said first timer is within a first predetermined range of values, and sets an additional attribute for said user contained in said database, said additional attribute causing a dialog prompt will be displayed on said display asking said user if said user wants said closed captioning subsystem to be enabled if said user had disabled said audio subsystem.

14. The system of claim 10, wherein said processor operates to start a first timer when said user manually enables said audio subsystem; and stops said first timer when said user manually enables said closed captioning subsystem after said closed captioning subsystem had automatically been disabled after said user has manually enabled said audio subsystem; and wherein said processor detects if the value of said first timer is within a first predetermined range of values, and sets an additional attribute for said user contained in said database, said additional attribute causing a dialog prompt will be displayed on said display asking said user if said user wants said closed captioning subsystem to be disabled if said user had enabled said audio subsystem.

15. The system as in claim 1, wherein the software application controls operation of said audio subsystem, and said software determines which of a plurality of users is logged on, and automatically determines how to set the audio subsystem based on who is logged on.

16. The system as in claim 1, wherein said processor runs a program that determines which of a plurality of users is logged on, automatically sets a first profile for a first user being logged and automatically set said second profile for said second user, to thereby automatically cause said audio subsystem to react differently based on which user is logged in.

17. A digital television system comprising:

a television receiver, having a display output, said receiver operable to produce an output indicative of display television content on the display and said output includes display text overlaid on said television content;

an audio subsystem that produces content associated with said television content;

a closed captioning subsystem that produces said text;

a process operatively coupled to the display and to the television receiver;

said processor operative to determine a user who is logged in at a current time, and to select one of said profiles automatically depending on which of said users is logged in, said processor using a first profile to determine a first attribute that occurs when close captioning is initiated and to determine a second attribute that occurs when said closed captioning is initiated, said first attribute different than said second attribute;

said profiles including said at least one attribute associated with said user that sets a behavior of said audio subsystem relative to operation of the closed captioning subsystem, where said multiple profiles include a first profile for a first user which causes the audio subsystem to have a first behavior when said closed captioning system is turned on, and includes a second profile for a second user which cause the audio subsystem to have a second behavior different than the first behavior when said closed caption being subsystem is turned on, wherein said processor determines which of said plurality of users is logged on, and automatically sets the profile to automatically cause the audio system to have a behavior relative to the close captioning subsystem, depending on which user is logged on.

\* \* \* \* \*